United States Patent
Suzuki et al.

(10) Patent No.: US 6,197,895 B1
(45) Date of Patent: Mar. 6, 2001

(54) PROCESS FOR PRODUCTION OF CHLORINATED POLYVINYL CHLORIDE RESIN

(75) Inventors: Takeyuki Suzuki; Hiroaki Shiota, both of Hyogo; Minoru Isshiki, Shiga, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/120,382

(22) Filed: Jul. 21, 1998

(30) Foreign Application Priority Data

Jul. 29, 1997 (JP) .................................................. 9-202887

(51) Int. Cl.$^7$ ...................................................... C08F 8/22
(52) U.S. Cl. ........................ 525/356; 525/331.6; 525/358
(58) Field of Search ..................................... 525/356, 358

(56) References Cited

U.S. PATENT DOCUMENTS

| | | |
|---|---|---|
| 3,627,853 | * 12/1971 | Bond et al. ............................ 525/356 |
| 4,386,189 | * 5/1983 | Ackerman et al. .................... 525/356 |
| 5,216,088 | 6/1993 | Cinadr et al. . |

FOREIGN PATENT DOCUMENTS

| | | |
|---|---|---|
| 421150 | 4/1991 | (EP) . |
| 556625 | 8/1993 | (EP) . |
| 58-103507 | 6/1983 | (JP) . |
| 01006002 | 1/1989 | (JP) . |
| 6-228226 | 8/1994 | (JP) . |

* cited by examiner

*Primary Examiner*—Bernard Lipman
(74) *Attorney, Agent, or Firm*—Jordan and Hamburg LLP

(57) ABSTRACT

In producing chlorinated polyvinyl chloride resin having chlorination degree of 60–73% by weight, wherein polyvinyl chloride resin is suspended in an aqueous medium and chlorine gas is blown into said suspension under beam of a mercury lamp in the temperature range of 40–90° C., an organic peroxide compound having a 10 hour half-life in the range of 40–90° C. is added into the reaction vessel in the ratio of 0.01–1 parts to 100 parts of the polyvinyl chloride resin by weight before the chlorination reaction is started. By this method, the time for chlorination reaction can be shortened without sacrificing the initial coloring and the heat stability, whereby chlorinated polyvinyl chloride can be produced with significantly improved productivity.

4 Claims, No Drawings

PROCESS FOR PRODUCTION OF CHLORINATED POLYVINYL CHLORIDE RESIN

BACKGROUND OF THE INVENTION

1. Field of the Invention

The present invention relates to a production method of chlorinated polyvinyl chloride resin. More precisely, it relates to a production method of a chlorinated polyvinyl chloride resin which makes it possible to shorten the time for chlorination reaction without sacrificing the initial coloring and heat stability of the chlorinated polyvinyl chloride resin, thereby improving productivity thereof.

2. Prior Art

A chlorinated polyvinyl chloride resin (hereinafter, referred to as "CPVC") can be obtained by chlorination of a polyvinyl chloride resin (hereinafter, referred to as "PVC"). CPVC is characterized by having a heat resistance superior to that of PVC while keeping excellent properties of PVC, and therefore it is used for pipes, joints, industrial plates, sheet or the like wherein heat resistance is required.

However, CPVC is not good in heat stability compared with PVC, that is, it is easily decomposed by heat during a molding process, which makes a long duration molding process problematical or discoloration may occur particularly in a transparent molded product, or some other problems may occur.

Production methods of CPVC, wherein chlorine gas is blown into a aqueous suspension of PVC under beaming of a mercury lamp, have been disclosed in Japanese Laid-Open Patent Publications Sho 58-103507 (1983) and Sho 64-6002 (1989), for example. In these publications, it has been proposed to shorten the time for chlorination and thereby to improve the productivity. That is, it is described that the time for chlorination is shortened and consequently the productivity is improved mainly by increasing the intensity of the mercury lamp together with raising the temperature of reaction in a process of chlorination reaction.

However, in obtaining CPVC by these methods, because of the above-mentioned problems inherent in CPVC, that are the initial coloring problem in the molding process and the deterioration of heat stability, shortening the time for reaction significantly has not yet been achieved.

In other words, as a production method of CPVC, a method to shorten the chlorination reaction time and thereby to improve the productivity without sacrificing the initial coloring and the heat stability has not been proposed yet, as a matter of fact.

PURPOSE OF THE INVENTION

The purpose of the present invention is to provide a production method of chlorinated polyvinyl chloride resin which is characterized by that the time for chlorination reaction can be shortened without sacrificing the initial coloring and the heat stability during molding process, whereby the productivity is significantly improved.

SUMMARY OF THE INVENTION

As a result of intensive study by the inventors of the present invention to solve the above-mentioned problems, it was found that in the chlorination process of PVC in the state of aqueous suspension under beaming, it is possible to shorten the time for chlorination reaction without sacrificing the initial coloring and the heat stability and thereby to improve the productivity significantly, by adding a certain amount of a specific kind of organic peroxide into the reaction vessel, and the present invention has been achieved.

That is, the method for production of CPVC of the present invention is characterized by that an organic peroxide compound having a 10 hour half-life in the range from 40 to 90° C. is added into the reaction vessel in a ratio of 0.01–1 part to 100 parts of the PVC by weight before the chlorination reaction is started, when a method for production of CPVC is performed, which method comprises a step of suspending PVC in an aqueous medium, and a step of blowing chlorine gas into said suspension under the beam of a mercury lamp within the temperature range of 40–90° C., thereby producing CPVC having a chlorination degree ranging from 60 to 73% by weight.

According to the present invention, a method for production of CPVC is provided wherein the time for chlorination reaction is shortened without sacrificing the initial coloring and the heat stability, whereby the productivity is significantly improved.

DETAILED DESCRIPTION OF THE INVENTION

PVC employed in the present invention is a polymer of vinyl chloride type monomer. In the vinyl chloride type monomer, vinyl chloride monomer and other monomers to be copolymerizable with the vinyl chloride monomer are involved. As examples of the monomers copolymerizable with a vinyl chloride monomer, mentioned are ethylene, propylene, vinylacetate, aryl chloride, aryl glycidyl ether, acrylic acid ester, methacrylic acid ester, vinyl ether and so on, and these monomers are used alone or as a combination of two or more kinds of monomers. And the amount of these monomers to be employed is approximately 0–20 parts to 100 parts of vinyl chloride monomer by weight.

The production method of PVC employed as a raw material is not particularly limited. That means, PVC to be employed can be prepared by any method such as suspension polymerization, emulsion polymerization, solution polymerization of bulk polymerization. The suspending agent employed in the suspension polymerization is not limited.

Average polymerization degree of PVC is not particularly limited either, but from the point of view that the application of the obtained CPVC is pipe, joint, industrial plate, sheet or the like, it is preferably in the range of 400–2,000. When the average polymerization degree is lower than 400, the impact strength of the molded products tend to be deteriorated, and when it is over 2,000, the melt viscosity of CPVC tends to be high which makes processing hard.

The organic peroxide compound having a 10 hour half-life in the range of 40–90° C. (an organic peroxide compound which requires 10 hours to decompose until becoming a half at some temperature in the range from 40° C. to 90° C.) employable in the present invention is a known chemical compound, which is a diacyl peroxide, peroxydicarbonate, peroxyester, peroxyketal or the like. As concrete examples, mentioned are di-n-propylperoxydicarbonate, diisopropylperoxydicarbonate, 1,1,3,3-tetramethylbutylperoxyneodecanoate, bis(4-t-butylcyclohexyl)peroxydicarbonate, 1-cyclohexyl-1-methylethylperoxyneodecanoate, di-2-ethoxyethylperoxydicarbonate, di(2-ethylhexylperoxy)dicarbonate, t-hexylperoxyneodecanoate, dimethoxybutylperoxydicarbonate, di(3-methyl-3-methoxybutylperoxy)dicarbonate, t-butylperoxyneodecanoate, 2,4-dichlorobenzoyl peroxide, t-hexylperoxypivalate, t-butylperoxypivalate, 3,5,5-trimethylhexanoyl peroxide octanoyl peroxide, lauroyl peroxide, stearoyl peroxide, 1,1,3,3-tetramethylbutylperoxy-2-ethylhexanoate, succinic acid peroxide, 2,5-dimethyl-2,5-di(2-ethylhexanoylperoxide)

hexane, 1-cyclohexyl-1-methylethylperoxy-2-ethylhexanoate, t-hexylperoxy-2-ethylhexanoate, t-butylperoxy-2-ethylhexanoate, m-toluoyl-and-benzoyl peroxide, t-butylperoxyisobutylate, 1,1-bis(t-hexylperoxy)3,3,5-trimethylcyclohexane, 1,1-bis(t-hexylperoxy)cyclohexane, 1,1-bis(t-butylperoxy)-3,3,5-trimethylcyclohexane or the like. In the present invention, such organic peroxide compound is used alone or as a combination of two or more kind of the compounds.

When an organic peroxide compound having the half-life period of 10 hours at a temperature out of the range of 40–90° C. is employed, the effect of shortening the time for chlorination reaction is not obtained. An organic peroxide compound which is soluble in an organic solvent is preferred to a water-soluble one in effectiveness of shortening the time for chlorination reaction.

The temperature at which the half-life period is 10 hours is more preferably in the range of 45–80° C., and by using the organic peroxide compound having the half-life period of 10 hours at any temperature in this range, the effect of shortening the time for chlorination reaction can be seen more significantly.

The above-mentioned organic peroxide compound is to be added into the reaction vessel in the ratio of 0.01–1 part to 100 parts of PVC by weight before the chlorination reaction is started. In case that the ratio of the compound is below 0.01 parts by weight, the effect of shortening the chlorination reaction time may not be obtained, and on the other hand, in case that it is over 1 part by weight, the initial coloring and the heat stability in the molding process of the obtained CPVC may be deteriorated. In order to remarkably shorten the chlorination reaction time without sacrificing the initial coloring as well as the heat stability, more preferably 0.03–0.5 part by weight of the organic peroxide is to be added.

Chlorination degree of CPVC obtainable by the method of the present invention is in the range of 60–73% by weight. And the range of chlorination degree of CPVC wherein the effect of the present invention appears most significantly is 62–70% by weight.

In the method of the invention, the beam of a mercury lamp is essential, and if the beam of the mercury lamp is not employed but only the organic peroxide compound is employed, the speed of chlorination reaction is extremely slowed.

EXAMPLES

Hereinafter, the present invention will be described in more detail by way of the examples, but the invention is not limited to the examples.

In the following description, "part" or "%" means "part by weight" or "% by weight" respectively unless described specifically.

And, the method of heat stability test and measuring method of b value as coloring difference of pressed plaque conducted in the examples and comparative examples are as follows.
(A) Heat Stability Test Roll-milled sheet specimen of 50×40 mm size was heated up at 190° C. in a gear oven. The specimen was sampled out from the gear oven every 15 minutes and the change of the color was observed by eye. The time required to change to black color blackening time: minutes) is shown.
(B) Initial Coloring By using a color difference detector (made by Nippon Denshoku Kogyo Co., Σ80 color measuring system), b value (yellowing degree) of the pressed plaque was measured.

Example 1

As a PVC, employed was a powdery PVC which had been produced by a suspension polymerization process, having an average polymerization degree of 700 and an average particle size of 160 μm.

Into a reaction vessel, 15 kg of the PVC powder, 35 kg of deionized water and 15 g of 3,3,5-trimethylhexanoyl peroxide (having the half-life period of ten hours at 59.4° C.) were poured and sufficiently stirred. After then, the inside air was suctioned by using a vacuum pump until the inside pressure became −0.6 kg/cm$^2$ G and that pressure was maintained for 10 minutes.

Next, after the vessel was purged of the remaining oxygen gas with nitrogen gas, the inside atmosphere was suctioned again by using a vacuum pump until the inside pressure became the above-mentioned pressure, and that pressure was maintained for 10 minutes to remove the still remaining oxygen in the reaction vessel.

Then, chlorine gas was supplied to the reaction vessel, and after substituting the inside of the reaction vessel with chlorine gas for 10 minutes, the chlorination reaction was conducted with the beam of high pressure mercury lamp of 100 W in the initial stage and with that of 200 W after 2 hours passed. The temperature for the chlorination reaction was 40° C. in the initial stage and then raised up to 70° C. in 1.5 hours. After then, the temperature was constantly kept to be 70° C.

By calculating the chlorination degree from the hydrogen chloride concentration of the contents of the reaction vessel, the beam of the mercury lamp was stopped and the supply of chlorine gas was terminated at the point when the chlorine content of CPVC was 65% by weight. The reaction time was 195 minutes. Simultaneously, the reaction vessel was cooled down, and the remaining chlorine gas was removed by substitution with nitrogen gas, and the chlorination reaction was terminated. The obtained product was washed with deionized water, then dehydrated and dried to give CPVC in the form of white powder.

Example 2

Chlorination reaction was conducted in the same manner as in Example 1 except that 15 g of 3,3,5-trimethylhexanoyl peroxide and 15 g of t-butylperoxyneodecanoate (having the half-life period of ten hours at 46.4° C.) were employed together as the organic peroxide compounds. CPVC was obtained in the form of white powder. The time for the chlorination reaction was 185 minutes.

Example 3

Chlorination reaction was conducted in the same manner as in Example 1 except that 45 g of 3,3,5-trimethylhexanoyl peroxide was employed as the organic peroxide compound. CPVC was obtained in the form of white powder. The time for chlorination reaction was 180 minutes.

Example 4

Chlorination reaction was conducted in the same manner as in Example 1 except that 4.5 g of 3,3,5-trimethylhexanoyl peroxide was employed as the organic peroxide compounds. CPVC was obtained in the form of white powder. The time for chlorination reaction was 205 minutes.

Example 5

Chlorination reaction was conducted in the same manner as in Example 1 except that 15 g of t-butyl- peroxyneodecanoate was employed as the organic peroxide compound and the reaction temperature was 40° C. in the initial stage and raised up to 50° C. in 1.5 hours, and the temperature was constantly kept to be 50° C. after then. CPVC was obtained in the form of white powder. The time for chlorination reaction was 230 minutes.

Example 6

Chlorination reaction was conducted in the same manner as in Example 1 except that 15 g of t-hexylperoxypivalate (having the half-life period of ten hours at 53.2° C.) was employed as the organic peroxide compound. CPVC was obtained in the form of white powder. The time for chlorination reaction was 195 minutes.

Example 7

Chlorination reaction was conducted in the same manner as in Example 1 except that 15 g of 1-cyclohexyl-1-methylethylperoxy-2-ethylhexanoate (having the half-life period of ten hours at 67.5° C.) was employed as the organic peroxide compound. CPVC was obtained in the form of white powder. The time for chlorination reaction was 195 minutes.

Comparative Example 1

Chlorination reaction was conducted in the same manner as in Example 1 except that the organic peroxide compound was not employed. CPVC was obtained in the form of white powder. The time for chlorination reaction was 220 minutes.

Comparative Example 2

Chlorination reaction was conducted in the same manner as in Example 5 except that the organic peroxide compound was not employed. CPVC was obtained in the form of white powder. The time for chlorination reaction was 270 minutes.

Comparative Example 3

Chlorination reaction was conducted in the same manner as in Example 1 except that 15 g of α-cumylperoxyneodecanoate (having the half-life period of ten hours at 36.5° C.) was employed as the organic peroxide compound. CPVC was obtained in the form of white powder. The time for chlorination reaction was 220 minutes.

Comparative Example 4

Chlorination reaction was conducted in the same manner as in Example 1 except that 15 g of 1,1-bis(t-butylperoxy) cyclododecane (having the half-life period of ten hours at 95.0° C.) was employed as the organic peroxide compound. CPVC was obtained in the form of white powder. The time for chlorination reaction was 220 minutes.

TEST METHOD FOR PHYSICAL PROPERTIES OF CPVC

A composition shown in following Table 1 was prepared with employing each of CPVC obtained in the above-mentioned Examples 1–7 and Comparative Examples 1–4 respectively.

TABLE 1

| | |
|---|---|
| CPVC | 100 parts |
| MBS(Kane Ace B-31 made by Kanegafuchi Chem. Co. Ltd.) | 10 parts |
| Tin Stabilizer(octyltin - mercaptide) | 2 parts |
| Stearic Acid | 1 part |
| Paraffin Wax | 0.7 parts |

The composition was roll-milled at 185° C. for 3 minutes with clearance of 0.2 mm between two rolls. And the obtained roll-milled sheet was cut out to a size of 50 mm (vertical)×40 mm (horizontal), and the cut sheet was supplied for the heat stability test. On the other hand, roll-milled sheets of the same composition were separately prepared and placed one upon another to produce a 3 mm-thick pressed plaque by pressing at 195° C., and b value (yellowing degree) of it was measured by using a color difference detector. Obtained results are shown in following Table 2.

TABLE 2

| | Added organic peroxide | | | Reaction Temp. & Time | | Initial Coloring | Heat Stability (min.) |
|---|---|---|---|---|---|---|---|
| | Peroxide | (g) | (parts) | (° C.) | (min.) | (b value of plaque) | (blacking time) |
| Example 1 | A | 15 | 0.1 | 70 | 195 | 8.58 | 120 |
| Example 2 | A, B | 15, 15 | 0.1, 0.1 | 70 | 185 | 8.86 | 120 |
| Example 3 | A | 45 | 0.3 | 70 | 180 | 9.10 | 120 |
| Example 4 | A | 4.5 | 0.3 | 70 | 205 | 9.35 | 120 |
| Example 5 | B | 15 | 0.1 | 50 | 230 | 5.80 | 135 |
| Example 6 | C | 15 | 0.1 | 70 | 195 | 8.62 | 120 |
| Example 7 | D | 15 | 0.1 | 70 | 195 | 8.60 | 120 |
| Comparative Example 1 | — | — | — | 70 | 220 | 9.60 | 120 |
| Comparative Example 2 | — | — | — | 50 | 270 | 5.82 | 135 |
| Comparative Example 3 | E | 15 | 0.1 | 70 | 220 | 9.88 | 120 |
| Comparative Example 4 | F | 15 | 0.1 | 70 | 220 | 9.65 | 120 |

In Table 2, the code A to F is addressed to the following composition respectively.
A: 3,5,5-trimethylhexanoyl peroxide (temperature for the half-life period of ten hours: 59.4°)
B: t-butylperoxyneodecanoate (temperature for the half-life period of ten hours: 46.4° C.)
C: t-hexylperoxypivalate (temperature for the half-life period of ten hours: 53.2° C.)
D: 1-cyclohexyl-1-methylethylperoxy-2-ethylhexanoate (temperature for the half-life period of ten hours: 67.5° C.)
E: α-cumylperoxyneodecanoate (temperature for half-life period of ten hours: 36.5° C.)
F: 1,1-bis(t-butylperoxy)cyclododecane (temperature for the half-life period of ten hours: 95.0° C.)

As clearly shown in Table 2, according to the production method of the present invention, the time for chlorination reaction was shortened without sacrificing the initial coloring and the heat stability, and thereby the productivity was improved.

What is claimed is:
1. A process for the production of chlorinated polyvinyl chloride resin, comprising in a reaction vessel preparing a suspension of polyvinyl chloride resin in an aqueous medium containing an organic peroxide compound having a 10 hour half-life in the range of 40–90° C. in a weight ratio of 0.01 to 1 part of the organic peroxide compound to 100 parts of the polyvinyl chloride resin, purging oxygen gas from the reaction vessel by displacing the oxygen gas with nitrogen gas, blowing chlorine gas into the suspension while exposing the suspension to a beam of a high pressure mercury lamp thereby to chlorinate the polyvinyl chloride resin to form chlorinated polyvinyl chloride resin, and, when the chlorine content of the chlorinated polyvinyl chloride resin is 62 to 70% by weight, terminating the exposure of the suspension to the mercury lamp beam and terminating the blowing of chlorine gas into the suspension thereby to terminate the chlorination.

2. The method as claimed in claim 1, in which said organic peroxide compound is soluble in an organic solvent.

3. The method as claimed in claim 1 or 2, in which said organic peroxide compound is contained in said suspension in a weight ratio of 0.003–0.5 part to 100 parts of the polyvinyl chloride resin.

4. The method as claimed in claim 1 or 2, in which the 10 hour half-life of said organic peroxide is in the range of 45–80° C.

* * * * *